US012653105B2

(12) United States Patent
Olson

(10) Patent No.: US 12,653,105 B2
(45) Date of Patent: Jun. 16, 2026

(54) AUGER PAN AIR NOZZLE

(71) Applicant: Ploeger Oxbo Holding B.V.,
Roosendaal (NL)

(72) Inventor: Tyler Olson, Hammond, WI (US)

(73) Assignee: PLOEGER OXBO HOLDING B.V.,
Roosendaal (NL)

( * ) Notice: Subject to any disclaimer, the term of this
patent is extended or adjusted under 35
U.S.C. 154(b) by 476 days.

(21) Appl. No.: 18/179,867

(22) Filed: Mar. 7, 2023

(65) Prior Publication Data

US 2023/0284563 A1    Sep. 14, 2023

Related U.S. Application Data

(60) Provisional application No. 63/317,748, filed on Mar.
8, 2022.

(51) Int. Cl.
*A01D 75/00* (2006.01)
*A01D 61/00* (2006.01)
(52) U.S. Cl.
CPC ........... *A01D 75/00* (2013.01); *A01D 61/004*
(2013.01)
(58) Field of Classification Search
CPC .............................. A01D 75/00; A01D 61/004
See application file for complete search history.

(56) References Cited

U.S. PATENT DOCUMENTS

| 859,602 | A | * | 7/1907 | Green | A01D 34/30 |
| | | | | | 56/219 |
| 2,426,922 | A | | 9/1947 | Carroll | |
| 2,670,586 | A | * | 3/1954 | Phillips | A01D 57/10 |
| | | | | | 56/158 |
| 2,718,744 | A | * | 9/1955 | Phillips | A01D 57/10 |
| | | | | | 56/158 |

(Continued)

FOREIGN PATENT DOCUMENTS

| AU | 593879 | B2 | * | 2/1990 | | A01D 34/18 |
| CN | 205336874 | U | * | 6/2016 | | A01D 41/14 |

(Continued)

OTHER PUBLICATIONS

Geringhoff IAS Integrated Air System brochure, five pages, https://
pdf.agriexpo.online/pdf/carl-geringhoff-vertriebsgesellschaft-mbh-
co-kg/truflex-airsystem/169123-22555.html, printed Mar. 27, 2023.

(Continued)

*Primary Examiner* — Arpad Fabian-Kovacs
(74) *Attorney, Agent, or Firm* — Merchant & Gould, P.C.

(57)            ABSTRACT
A harvester includes a chassis having a head and an outlet
from the head to the chassis. A conveying system moves
harvested crop from the gathering assembly to the outlet, the
conveying system. The conveying system includes an auger
having a rotational axis extending along a longitudinal
direction and including a center shaft and a helical blade. An
auger pan extends parallel to the rotational axis of the auger.
The pan includes a first edge, a planar portion extending
beneath the auger, and a trough portion defining a lower (Continued)

section with a generally upward extending surface. An air nozzle extends along the first edge of the pan, the nozzle sloping upward from a first nozzle edge lower than the first edge of the pan to a second nozzle edge higher than the first edge of the pan.

18 Claims, 17 Drawing Sheets

(56)                    References Cited

U.S. PATENT DOCUMENTS

| | | | | |
|---|---|---|---|---|
| 2,734,331 | A * | 2/1956 | Phillips | A01D 57/10 56/158 |
| 2,737,006 | A * | 3/1956 | Klingler | A01D 57/10 37/447 |
| 2,832,187 | A * | 4/1958 | Johnson | A01D 41/1252 56/220 |
| 3,165,874 | A * | 1/1965 | Osteen | A01D 57/10 56/12.9 |
| 3,555,790 | A * | 1/1971 | Quick | A01D 57/10 56/14.4 |
| 3,623,302 | A | 11/1971 | Schmitt | |
| 4,177,628 | A | 12/1979 | Brandt | |
| 4,303,373 | A * | 12/1981 | Polhemus | A01D 57/10 415/206 |
| 4,406,112 | A * | 9/1983 | Brooks | A01D 57/10 56/12.9 |
| 4,429,516 | A | 2/1984 | Erickson | |
| 4,435,946 | A | 3/1984 | Erickson | |
| 4,730,444 | A * | 3/1988 | Leffel | A01D 45/30 56/12.9 |
| 4,783,951 | A * | 11/1988 | Richards | A01D 57/10 56/12.9 |
| 4,866,919 | A * | 9/1989 | Brooks | A01D 57/10 56/12.9 |
| 4,914,896 | A * | 4/1990 | Gullickson | A01D 57/10 56/12.9 |
| 4,936,082 | A * | 6/1990 | Majkrzak | A01D 57/10 56/220 |
| 4,970,849 | A * | 11/1990 | Friesen | A01D 41/10 56/344 |
| 5,129,216 | A * | 7/1992 | Gullickson | A01D 57/10 56/12.9 |
| 5,784,869 | A | 7/1998 | Rayfield | |
| 6,085,510 | A * | 7/2000 | McDonnell | A01D 57/10 56/12.9 |
| 6,561,896 | B1 | 5/2003 | Lauer | |
| 7,591,127 | B1 * | 9/2009 | Stacer | A01D 65/00 56/12.9 |
| 7,743,591 | B2 | 6/2010 | Meier et al. | |
| 9,462,750 | B2 * | 10/2016 | Cavkusic | A01D 61/008 |
| 9,936,639 | B2 | 4/2018 | Schloesser | |
| 10,098,280 | B2 * | 10/2018 | Busser | A01D 75/02 |
| 2002/0174636 | A1 | 11/2002 | Calmer | |
| 2007/0186530 | A1 | 8/2007 | Meier et al. | |
| 2009/0199529 | A1 * | 8/2009 | Schroeder | A01D 57/10 56/12.9 |
| 2010/0281835 | A1 | 11/2010 | Tipnis et al. | |
| 2011/0005181 | A1 | 1/2011 | Barnett et al. | |
| 2012/0190414 | A1 * | 7/2012 | Cressoni | A01D 45/021 460/29 |
| 2017/0251602 | A1 * | 9/2017 | Busser | A01D 45/021 |

FOREIGN PATENT DOCUMENTS

| | | | | | |
|---|---|---|---|---|---|
| CN | 206963364 | U | * | 2/2018 | A01D 41/06 |
| CN | 109618648 | A | * | 4/2019 | A01D 41/14 |
| CN | 115486264 | A | * | 12/2022 | B07B 1/04 |
| CN | 107155508 | B | * | 3/2023 | A01D 41/06 |
| CN | 117859523 | A | * | 4/2024 | A01D 75/00 |
| CN | 117981561 | A | * | 5/2024 | A01D 57/02 |
| CN | 118160502 | A | * | 6/2024 | A01D 47/00 |
| CN | 118435775 | A | * | 8/2024 | A01D 41/12 |
| DE | 2808243 | A1 | * | 8/1979 | A01D 41/147 |
| DE | 4240319 | A1 | * | 6/1994 | A01D 57/10 |
| DE | 102015110746 | A1 | * | 1/2017 | A01D 57/20 |

OTHER PUBLICATIONS

Geringhoff TruFlex Razor™ information sheet, one page.

* cited by examiner

FIG. 7
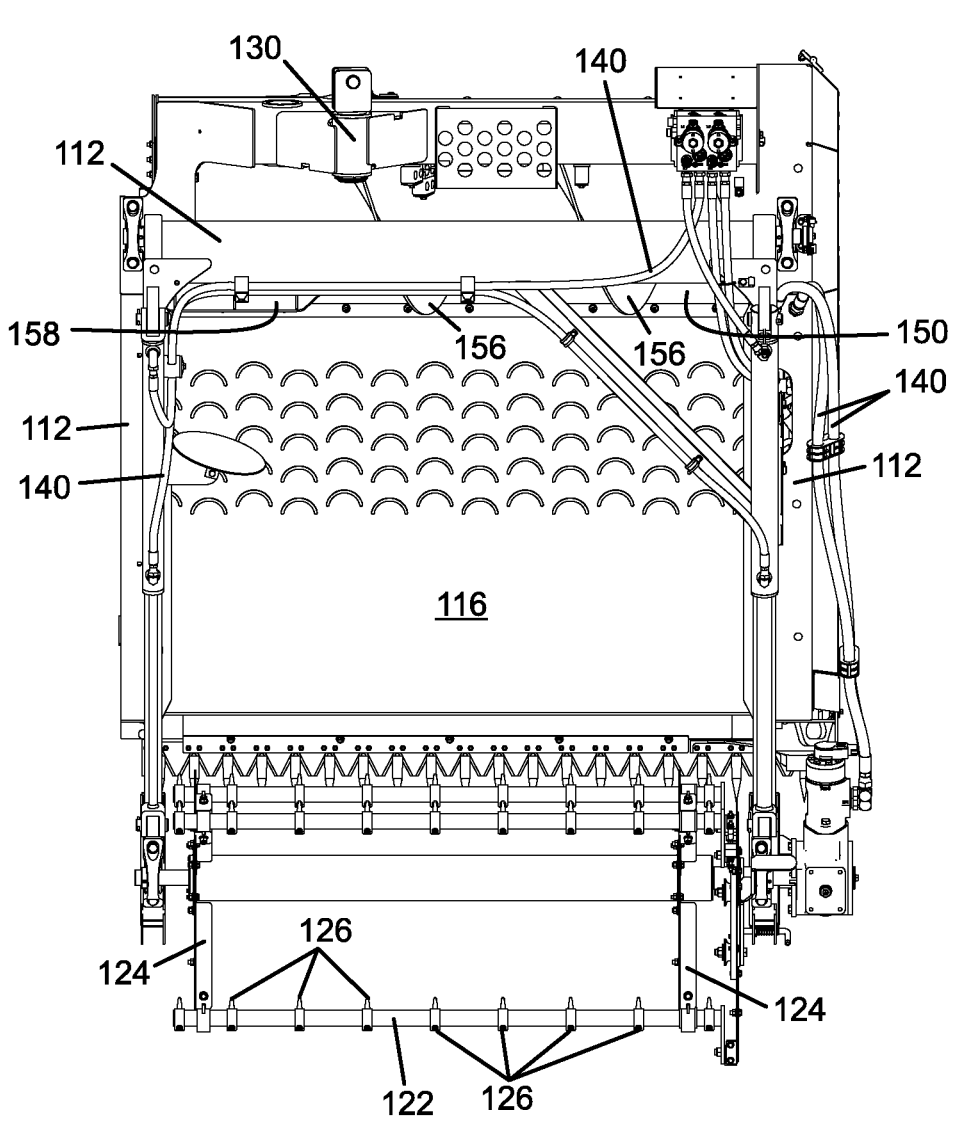

AUGER PAN AIR NOZZLE

BACKGROUND OF THE INVENTION

Field of the Invention

The present invention relates to a grain conveying auger system and in particular to an auger system with a contoured nozzle for directing air to the auger pan to clear grain from collecting in the bottom of the auger pan for improving transport efficiency.

Description of the Prior Art

Harvesters such as combine harvesters for harvesting crops are well known. For many crops a cutter bar and reel are utilized to cut and gather the crop to direct the crop to a belt, conveyor, or other transport. Such harvesters typically use a cross-conveyor such as an auger extending transverse to the direction of travel and conveying the crop towards a center conveyor for further threshing and/or storage. Such augers typically include a left side and right side rotating a continuous helical blade that engages the crop and imparts a movement along the bottom of a trough formed by an auger pan toward the center.

Although such auger conveying systems generally perform satisfactorily, problems can occur. As the pan forms a generally smooth trough in prior art augers and an operational clearance is required between the auger and the pan, crops may slide within the trough rather than being engaged by the helical blades and moved longitudinally along the auger. This decreases movement along the desired transport direction. The efficient transport of crops in a timely and efficient manner becomes more critical for crop test plot harvesters in which the crop harvested for each crop is closely measured and any crop remaining in the auger pan would lead to the yield being under measured. Moreover, very small pieces of some grains may not be engaged by the helical blade.

When used for corn, if the auger rotates and the ears of corn simply slide upward along a smooth surface, they may fall off the helical blade or carried over the center core and back to the bottom of the trough to be engaged by a next spiraling blade portion and movement of the ears along the desired transport direction is decreased. To address these problems a contoured auger pan was developed as disclosed in U.S. Pat. No. 9,936,639 to Schloesser entitled Contoured Auger Pan and assigned to Oxbo International Corporation. The contoured auger pan of U.S. Pat. No. 9,936,639 includes fighting to prevent the ears of corn from sliding upward along the pan and allowed the blades to engage and move the ears of corn longitudinally along the pan. In this manner, efficiency was significantly improved.

Although such an auger system with ridges formed in the pan has been very effective for moving ears of corn efficiently along an auger. However, such an approach is not suitable for augers transporting grains with a much smaller size harvested with a reel type combine harvester. The differences in scale between ears of corn and most grains make such a system impractical. The harvesting of relatively small grains with a continual flow of material create unique challenges for clearing an auger pan.

Systems have also been developed using air for combine harvesters behind the cutter bar. Such a system is disclosed in DE102015110746 Selting et al. This system aids in material movement from the front of the head rearward but does not facilitate moving material laterally toward an outlet or for clearing material from an auger pan after cutting of a crop test plot is finished.

It can be seen that a new and improved auger system is needed to efficiently transport crops including grains harvested with a reel type harvester along the auger pan. Such a system should ensure that there is no buildup of grains along the bottom of the auger pan. Such a system should ensure that the auger pan is continuously cleared so that batch of grain from each crop test plot is completely cleared from the auger and the yield is accurately measured. The present invention addresses these as well as other problems associated with efficiently transporting crop material along a helical auger.

SUMMARY OF THE INVENTION

The present invention is directed to a combine harvester and a head for a combine harvester, and in particular to a combine harvester and head having an air direction system for directing air for cleaning out material from the auger pan. The combine harvester includes a head having a reel rotating about an axis substantially perpendicular to a direction of travel.

The head may be foldable and may be configured with two wings, with each wing being adapted for independently harvesting a crop test plot. The head includes a cutter, such as a sickle bar at a front portion of the head.

In one embodiment, each wing includes a conveying system conveying harvested crop to transport crop gathered by the reel to the outlet. The conveying system includes an auger having a rotational axis extending along a longitudinal direction and including a center shaft and a helical blade. A portion of the auger nearer the inner portion of the head may include laterally extending blades. An auger pan extends parallel to the rotational axis of the auger, below the auger and curves upward to a rear wall behind the auger. The auger pan includes a discharge or outlet near a center of the head and aligned with the laterally extending blades. The transport system includes a feeder belt for receiving harvested crop from the reel and delivering the harvested crop to the auger. In one embodiment, a portion of the belt extends over a portion of the direction system and the first edge of the pan.

A front nozzle extends along the first edge of the pan. The front nozzle slopes upward from a first edge lower than the first edge of the pan to a second edge higher than the first edge of the pan. An air duct system below the auger delivers airflow to the front nozzle and includes a fan in one embodiment. The front nozzle includes a cover and vanes defining openings spaced longitudinally apart below the front nozzle. The vanes include lateral edges, with the lateral edges of the openings slanting progressively more from a center of the front nozzle assembly to an outer end of the front nozzle assembly. The lateral edges of the openings proximate a center of the pan and aligned with the outlet and the laterally extending blades of the auger are substantially perpendicular to the longitudinal axis. The vanes of the front nozzle are also configured with the outermost vanes extending substantially horizontally laterally and the inner most vanes extending substantially horizontally rearward. The orientation of the vanes along the front nozzle gradually changes from the outer later vanes to the inner horizontal rearward extending vanes. The cover and the vanes direct airflow from a duct to the auger pan and toward the auger outlet to clear material from the pan.

These features of novelty and various other advantages that characterize the invention are pointed out with particularity in the claims annexed hereto and forming a part hereof However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings wherein like reference letters and numerals represent correspond structure throughout the views:

FIG. 7 is a top plan view of the left wing assembly shown in FIG. 6;

DETAILED DESCRIPTION OF THE PREFERRED EMBODIMENT

Figure 1:
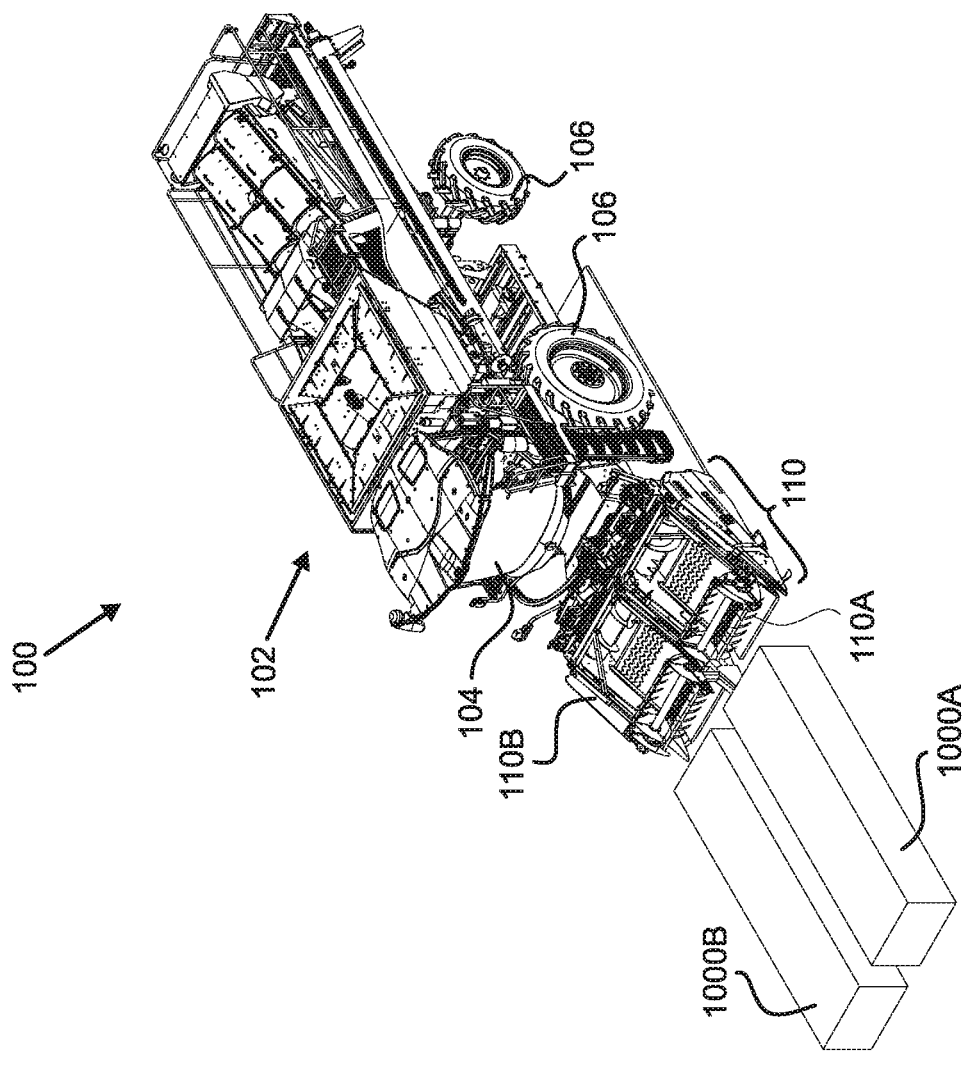
FIG. 1 is a perspective view of a combine harvester according to the principles of the present invention.
Figure 2:
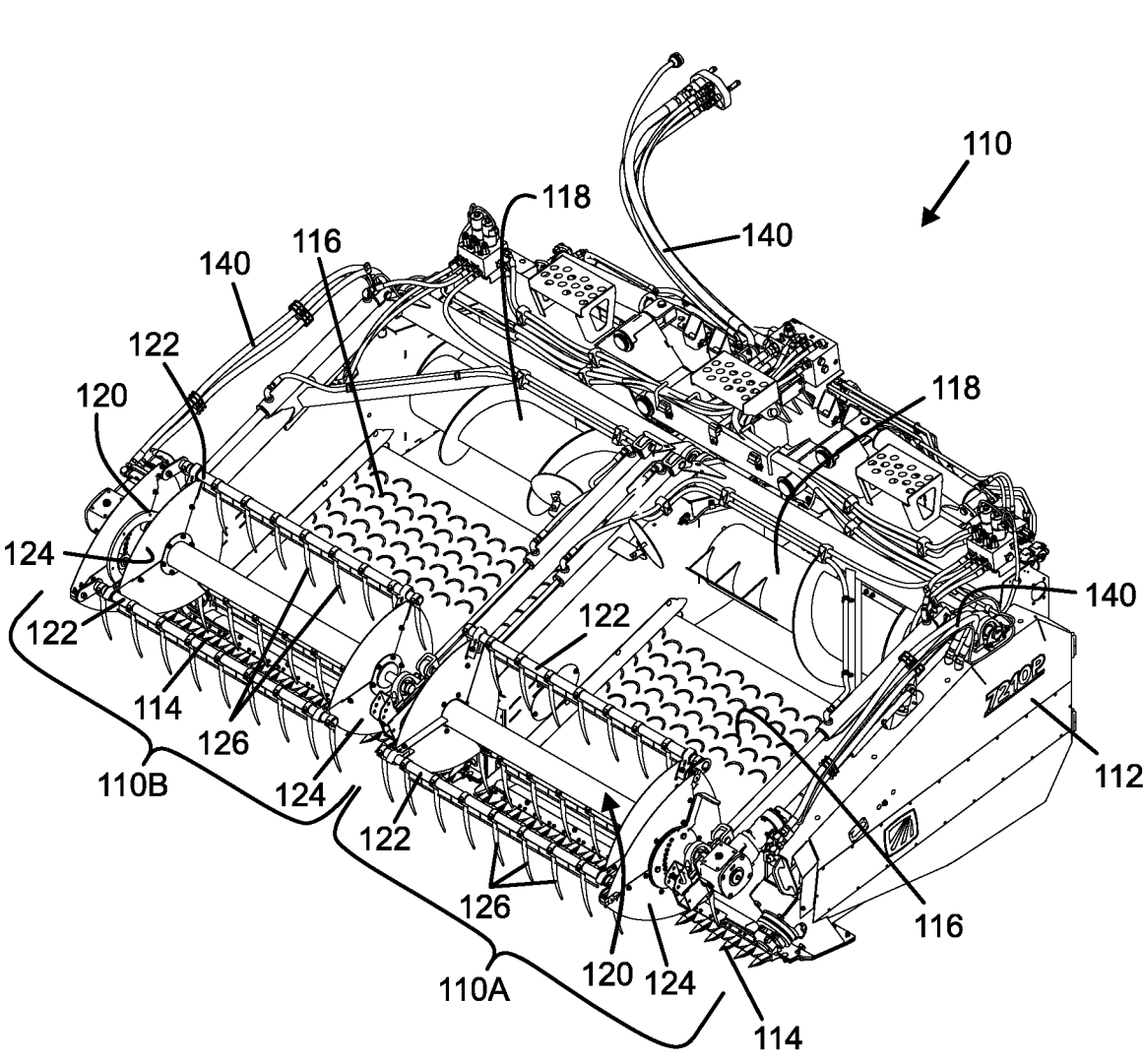
FIG. 2 is a perspective view of a head for the combine harvester shown in FIG. 1.
Figure 3:
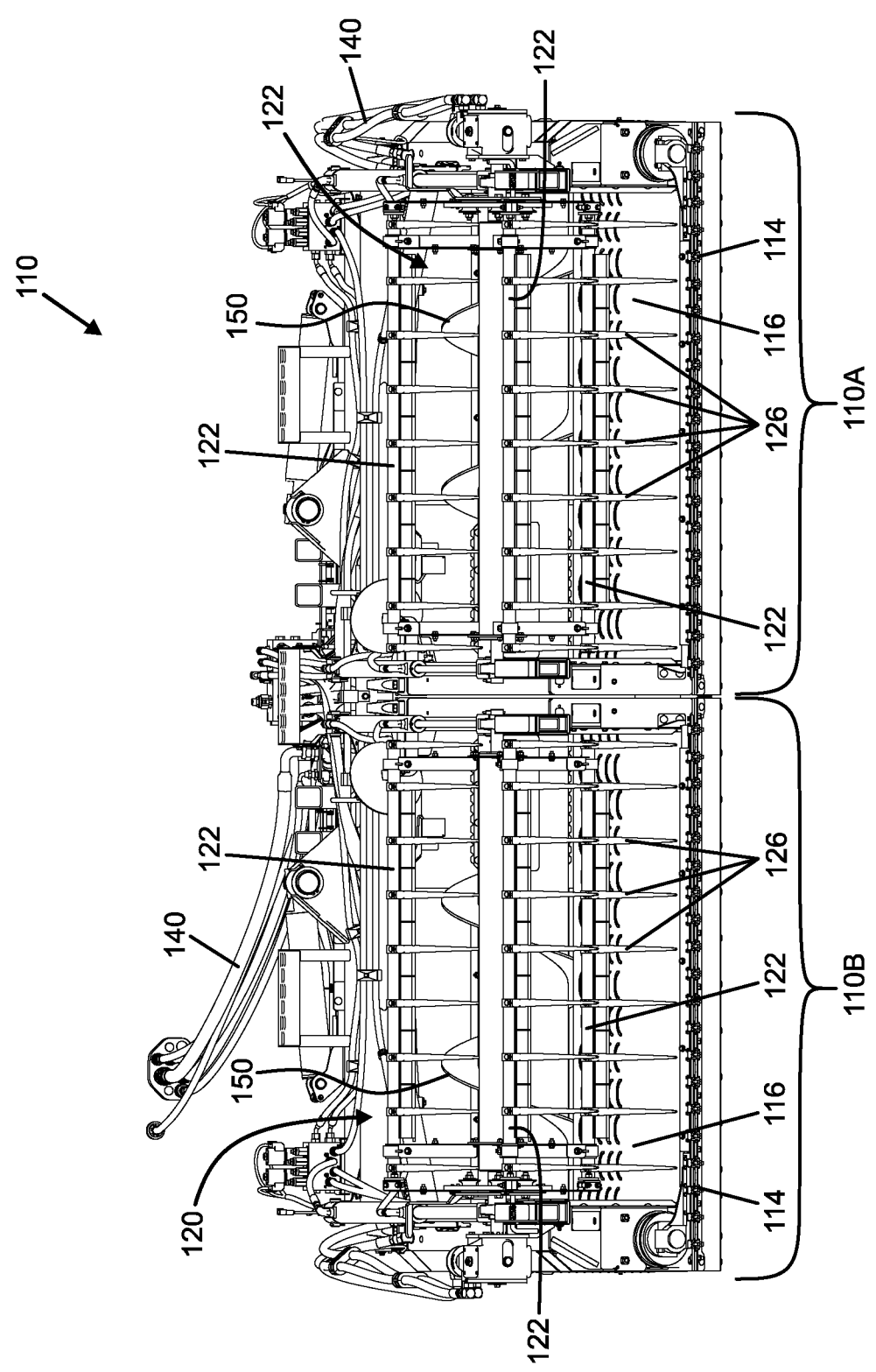
FIG. 3 is a front elevational view of the head shown in FIG. 2.
Figure 4:
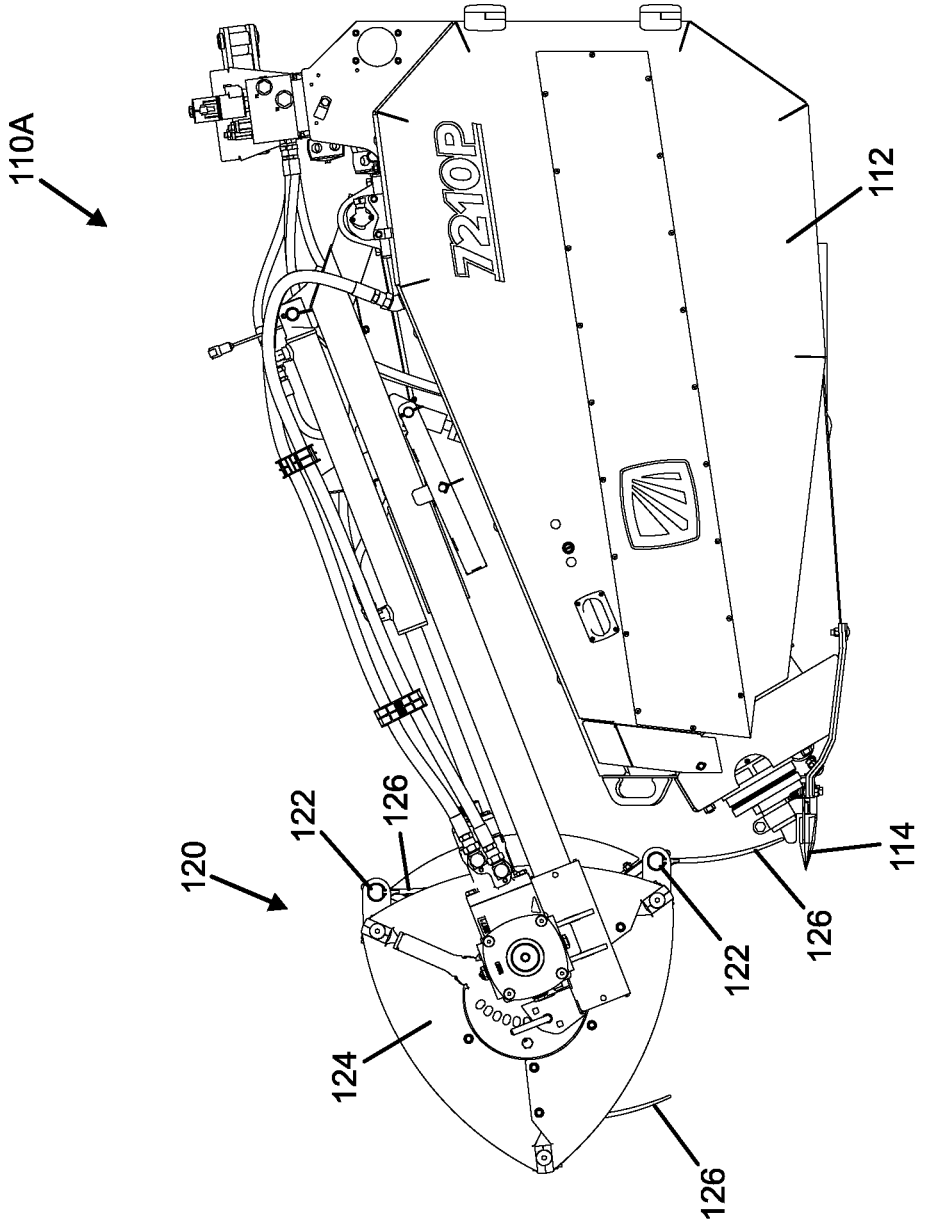
FIG. 4 is a left side elevational view of the head shown in FIG. 2.

Referring now to the drawings, and in particular to FIG. 1, there is shown a first embodiment of a combine harvester, generally designated (100). In one embodiment, the combine harvester (100) is configured as a crop test plot combine, such as the Oxbo® Model 9840 Research Plot Combine. The combine harvester (100) has a chassis (102) including all the components for processing harvested crop and recording data pertaining to the characteristics and the yield for each particular crop plot. In the embodiment shown, the combine harvester (100) is a twin plot combine with a head assembly (110) including a left head portion, or wing (110A) and a right head portion, or wing (110B). The wing (110A) is adapted to align with a conventional configuration of a first (left) crop test plot (1000A) while the wing (110B) is adapted to align with a second (right) crop test plot (1000B). The twin wing head assembly (110) is removably mounted on pivots (130) to be interchangeable with other heads, such as a corn type head, so that the combine harvester (100) may be used with a variety of different crops. The reel type head assembly (110) is typically used for crops such as wheat, canola, sorghum, and soybeans, among others. The combine harvester (100) also includes tracks or wheels (106) and is typically self-propelled. An operator sits in an elevated cab (104) that provides the operator with a clear view of the crop and the head assembly (110) for steering and operating controls.

Referring to FIGS. 2-5, the head assembly (110) is configured to process each crop plot individually. Therefore, the combine (100) uses a separate reel (120) on each of the wings (110A, 100B) to harvest the crop of an associated first crop test plot. The crop is transported from each wing (110A, 110B) and handled through the processing equipment of the combine (100). The characteristics of the crop will be measured and evaluated with the data recorded with on board equipment. In the embodiment shown in FIG. 1, the left crop test plot (1000A) and the right crop test plot (1000B) are separated and are processed separately. Each crop test plot is individually processed and analyzed, and the results of the analysis are stored in a processor. For crop test plot combines, the individual crop test plots must be harvested individually without harvested crop being mixed together to obtain accurate results. Moreover, it is critical that all harvested crop material be transported for processing so that accurate yields are determined.

In an embodiment shown in FIGS. 6-11, each of the wings (110A, 110B) includes a framework (112) that creates a general housing for the other elements. Cutters, such as sickle bars (114) or other conventional cutters as may be appropriate for the crop, are at the front of each of the wings (110A, 110B) below the reel (120). Feed belts (116) move the crop from the reel (120) rearward. Augers (118) or other transverse feeders, such as cross belts, move the harvested materials inward from the back of the feed belts (116). The reels (120) rotate about an axis substantially perpendicular to a direction of travel and include horizontally extending bars (122) that rotate and push the plants past the sickle bars (114) and gather the cut portions onto the feed belt (116). The reel bars (122) are mounted on end plates (124). In the embodiment shown, each reel (120) includes six horizontal reel bars (122), but other numbers of bars and/or reels having a larger or smaller diameter are also envisioned. In the embodiment shown, each of the bars includes a plurality of spaced apart fingers (126) that aid in engaging the plants and extend generally transverse to the horizontal reel bars (122), which extend parallel to the rotational axis of the reels (122) transverse to the direction of travel.

Referring to FIGS. 13-16, in one embodiment, each auger (150) includes a shaft (152) on an axle (154). A helical blade (156) winds longitudinally along the shaft (152). An auger pan (164) extends below and to the rear of the auger helical blade (156). The auger pan (164) includes seals (166) near its ends. The pan (164) extends substantially horizontally and curves from below and upward to a rear wall (168) forming a trough. An auger discharge or outlet (162) near the inner side of the wing (110A, 110B) is formed in the rear wall. The rear wall (168) also includes flanges (170) that help in brushing any material that clings to the helical blade (156). The helical blade (156) directs material delivered from the associated feed belt (116) to the inner side of the wing (110A, 110B) to the auger discharge (162). The auger (150) also includes longitudinally extending blades (158) having supports (160) proximate an inner end of the shaft (152). The longitudinally extending blades (158) are aligned in front of the auger discharge (162) to direct material into the discharge (162) for further processing.

Figure 5:
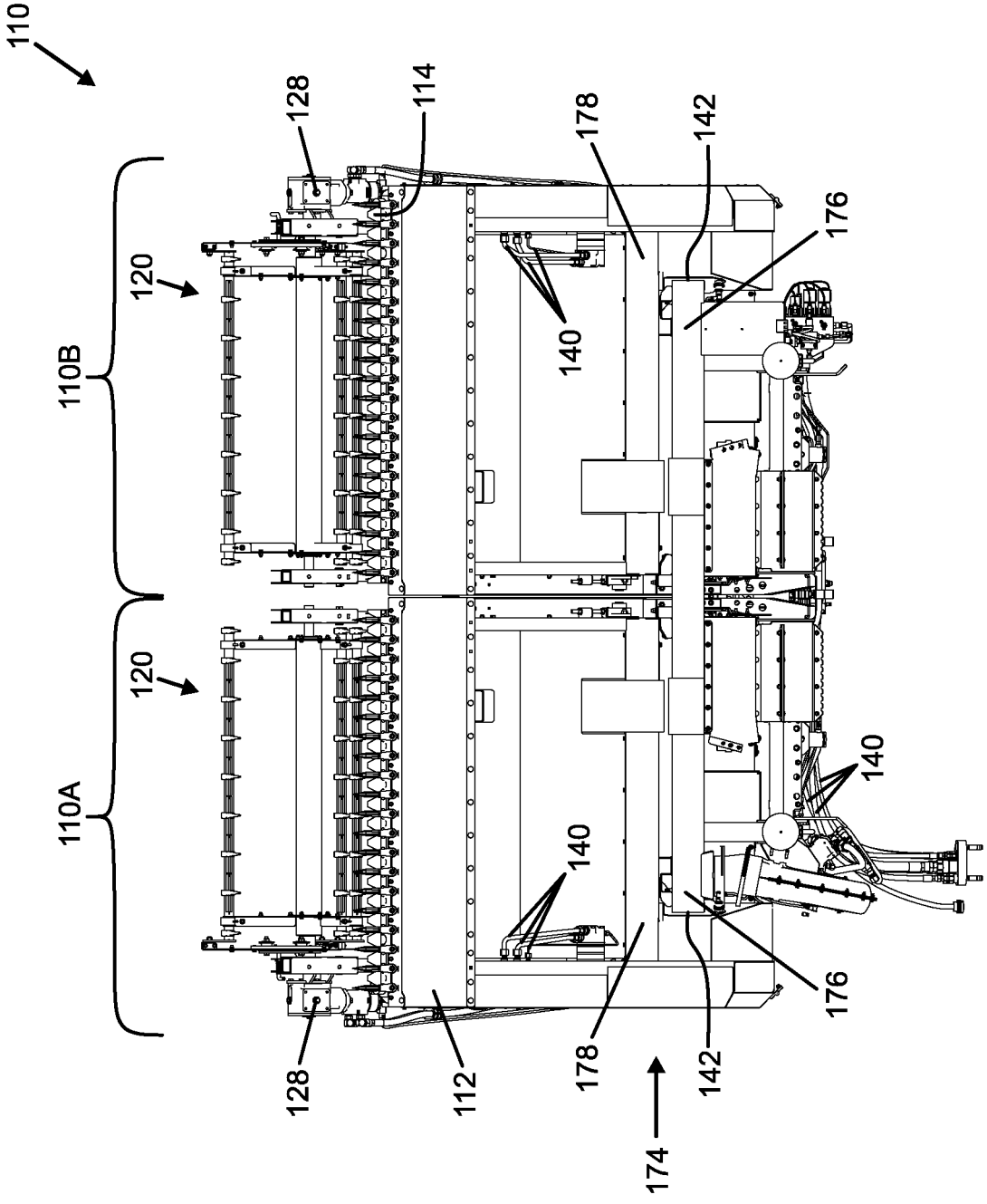
FIG. 5 is a bottom plan view of the head shown in FIG. 2.
Figure 6:
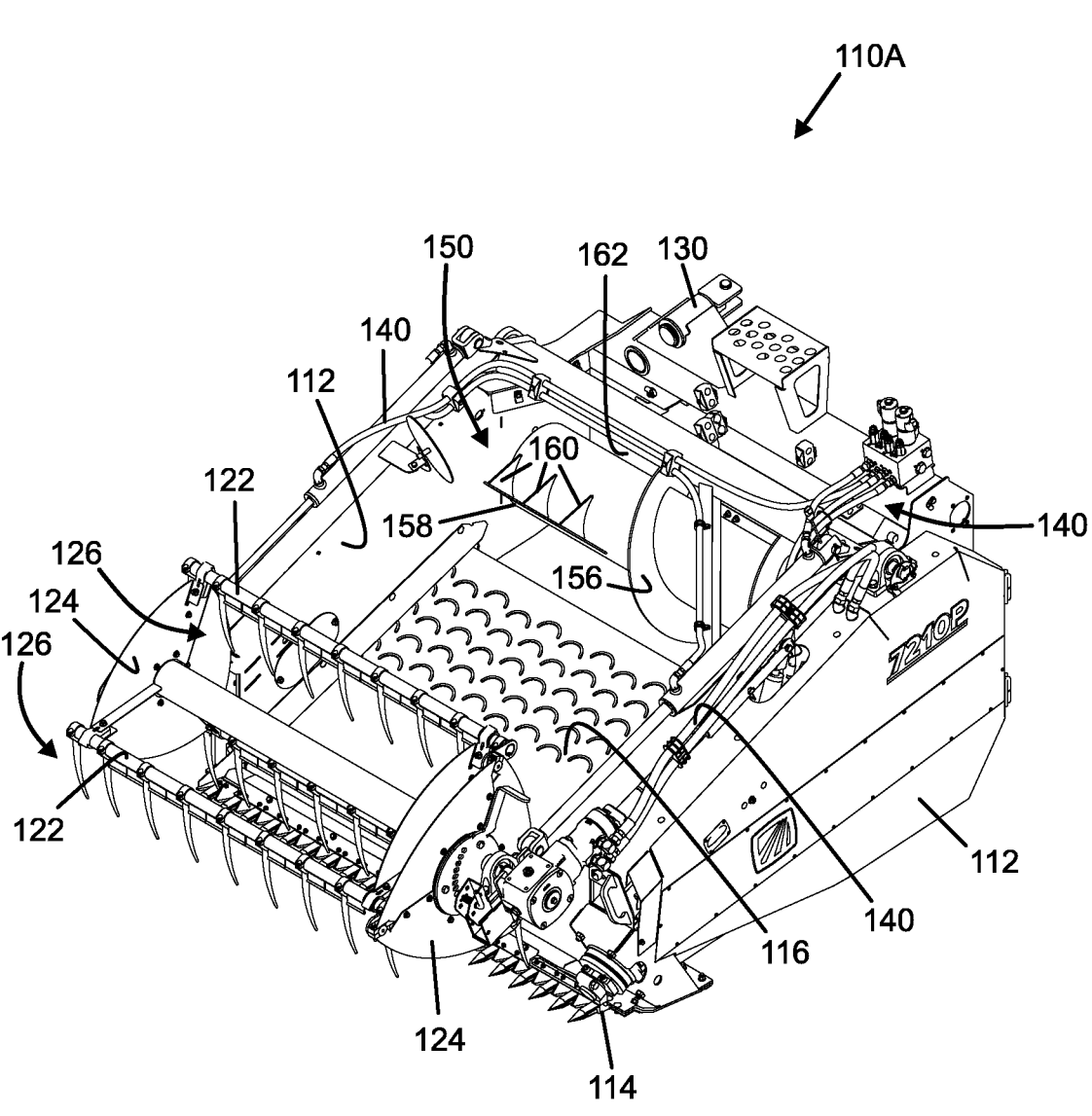
FIG. 6 is a perspective view of a left wing assembly for the head shown in FIG. 2.
Figure 8:
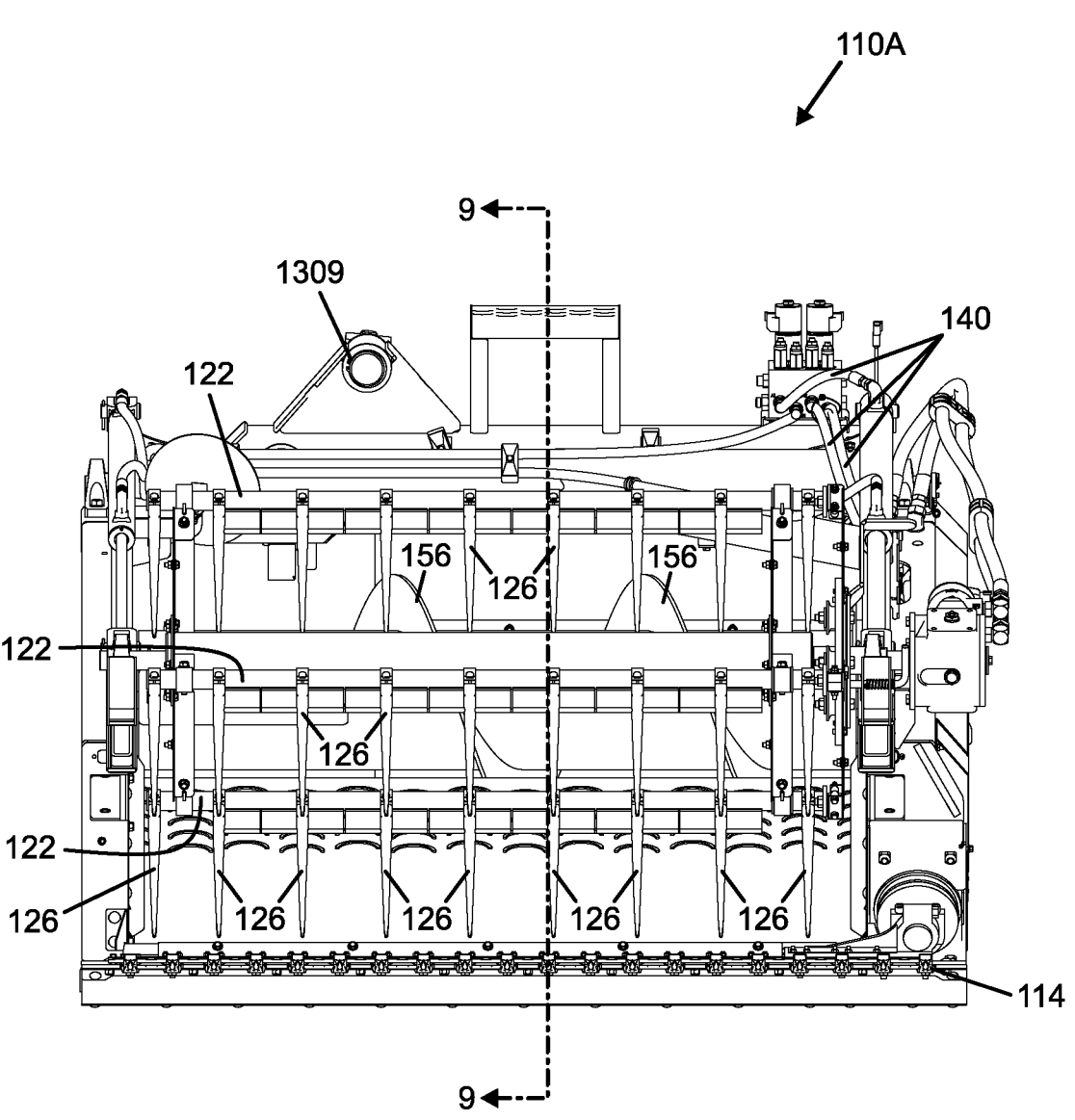
FIG. 8 is a front elevational view of the left wing assembly shown in FIG. 6.
Figure 9:
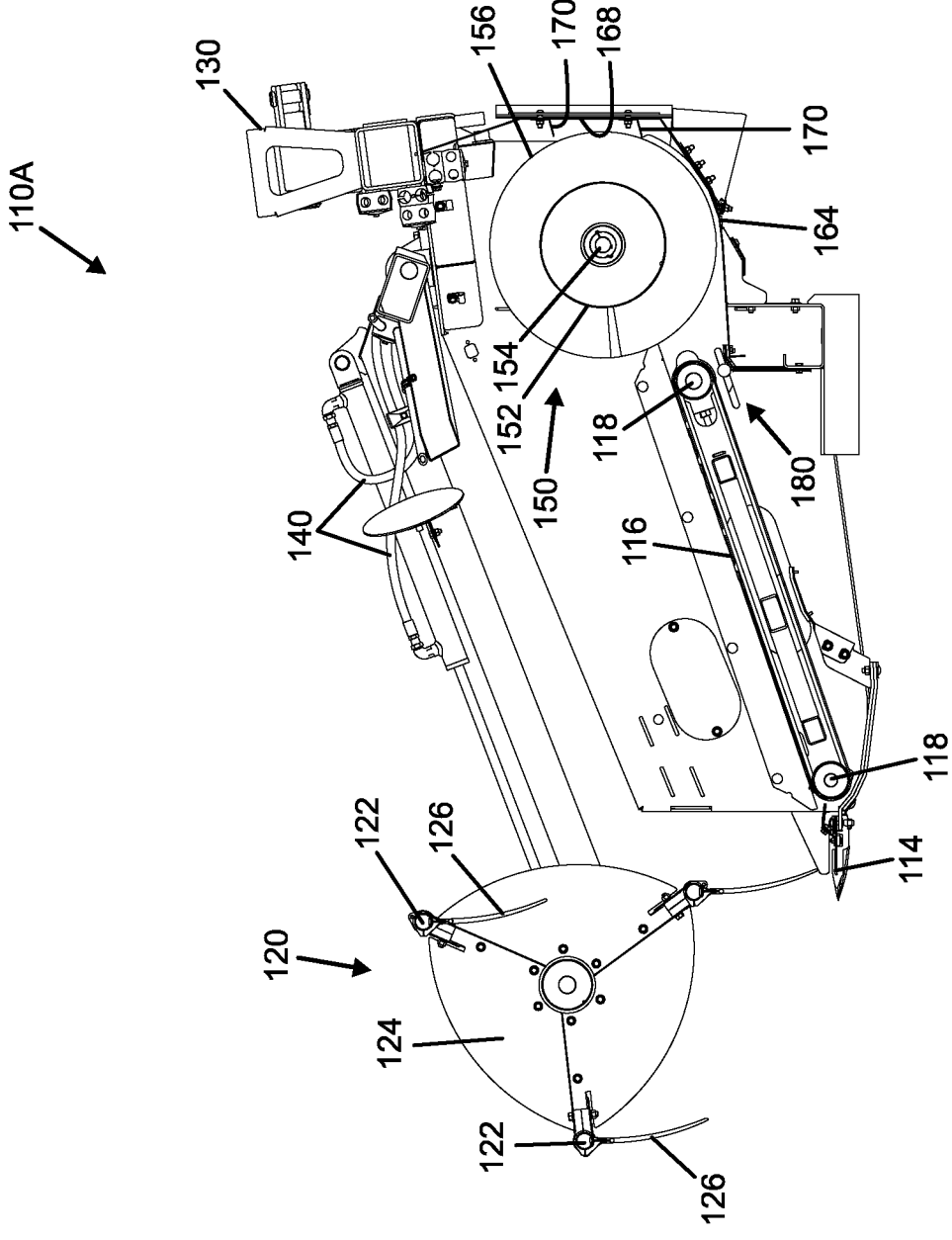
FIG. 9 is a sectional view taken along line 9-9 of FIG. 8.
Figure 10:
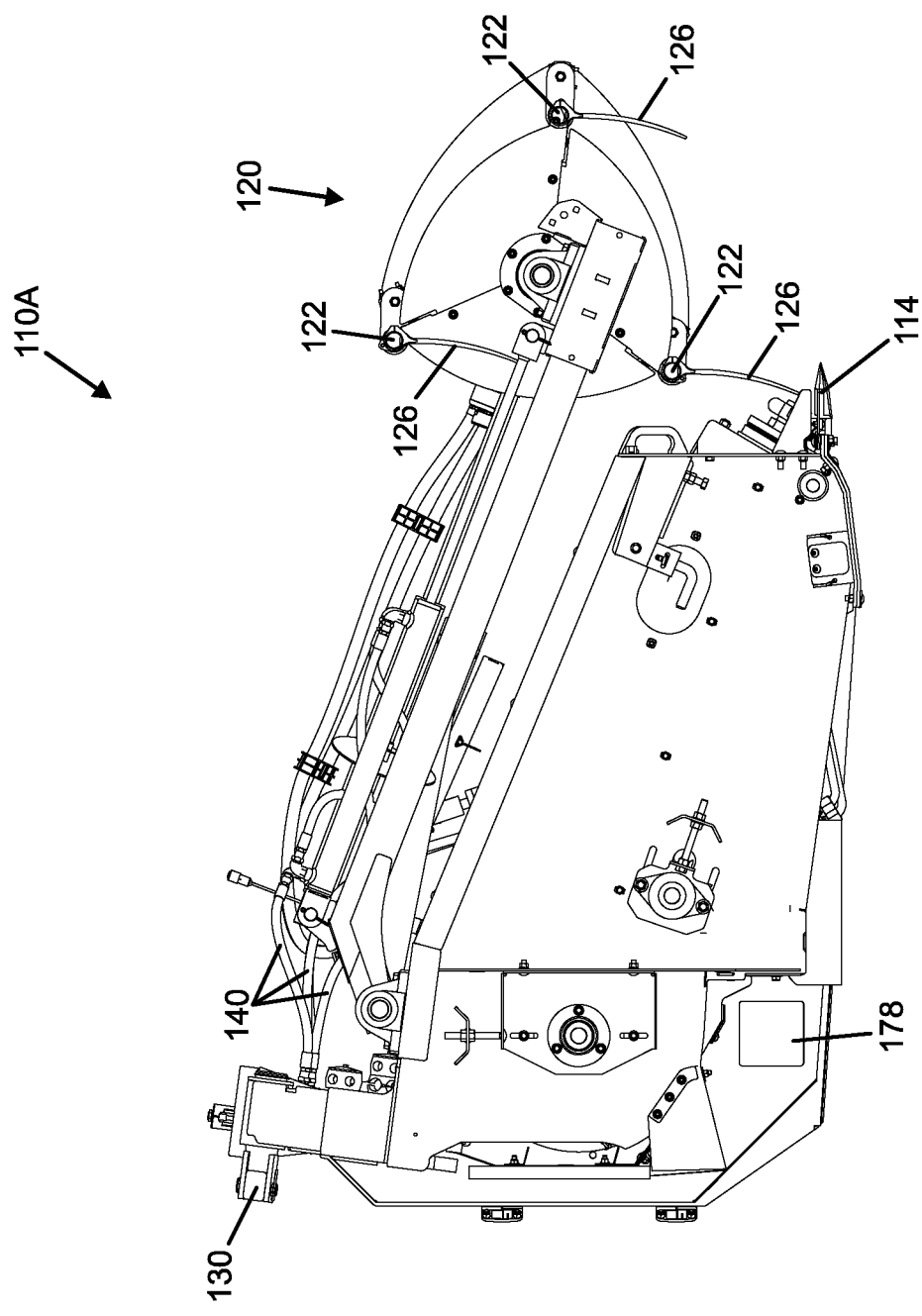
FIG. 10 is a side elevational view of the left wing assembly with portions removed.
Figure 11:
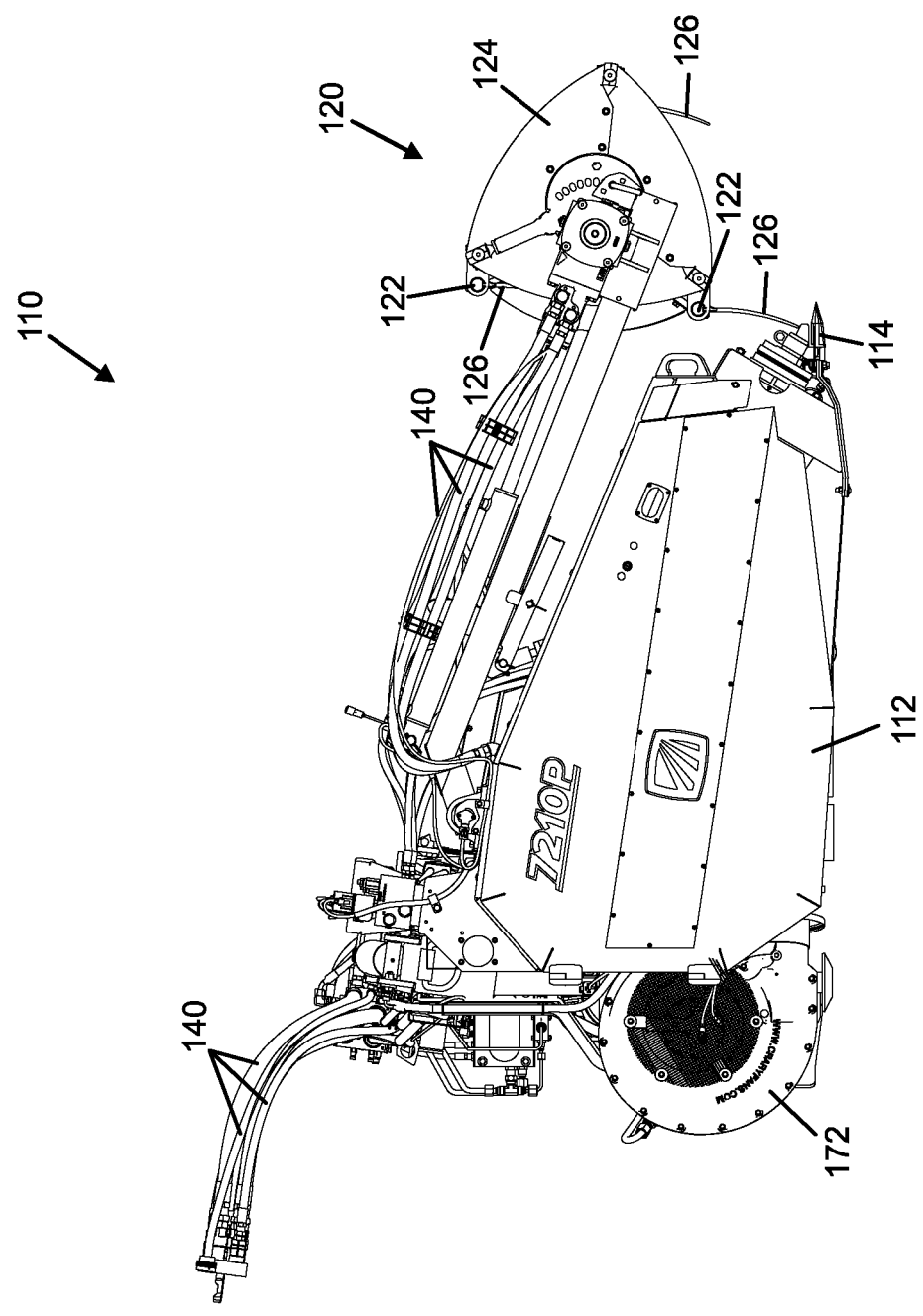
FIG. 11 is a side elevational view of the right wing assembly for the head shown in FIG. 2.

In addition to the helical blade (156), an air system (174) helps to convey the crop through the auger (150) and to discharge through the rear of the head assembly (110) to further processing systems within the combine chassis (102). As shown in FIG. 5, the air system (174) includes ducts providing air flow to the auger (150) to aid in emptying the auger pan (164) of material and to increase accuracy of the yield for each crop test plot. A first air duct (176) associated with the center frame includes end seals (142) to prevent air from escaping. The duct (176) supplies air from a fan (172), shown in FIG. 11, to a second duct (178) on each wing (110A, 110B). Each of the wing ducts (178) supplies air to an air direction assembly to help clear material from the auger pan (164).

Figure 12:
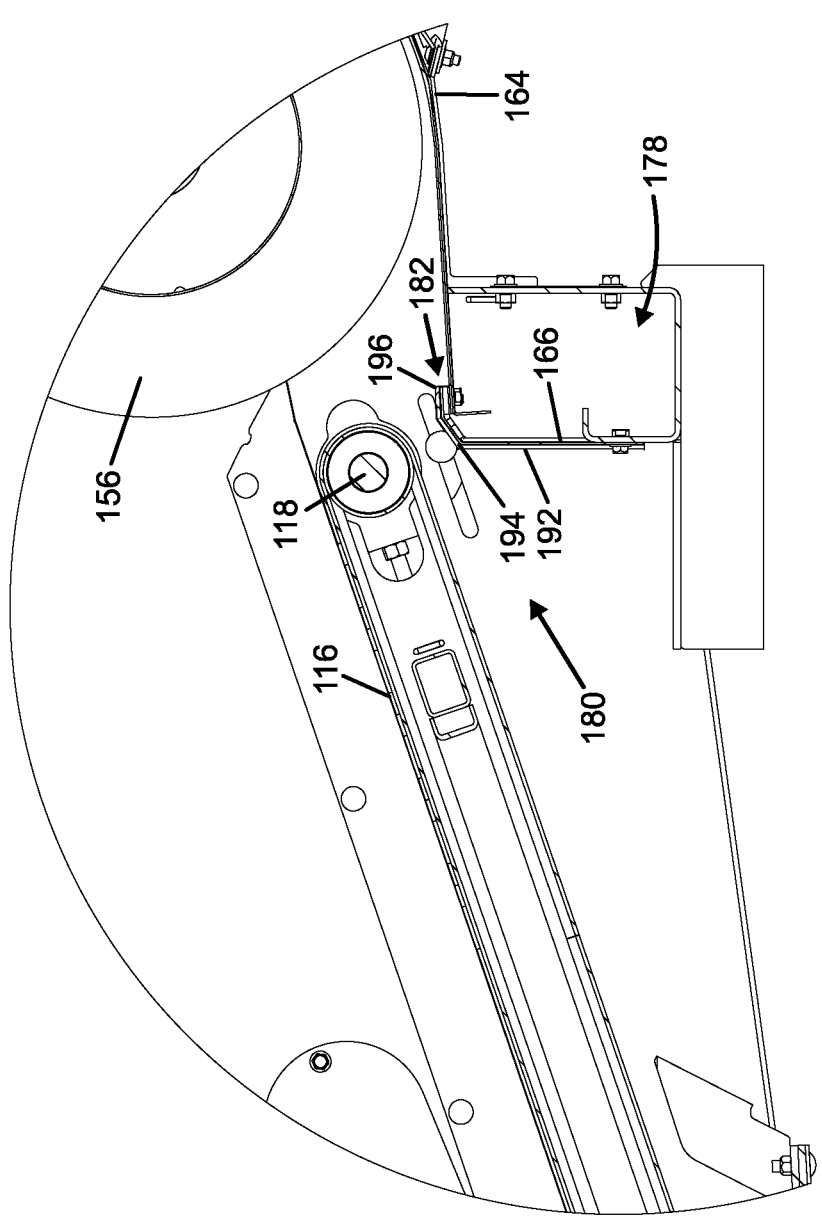
FIG. 12 is a side detail view of the auger, belt, air duct and front nozzle for the left wing shown in FIG. 11.
Figure 13:
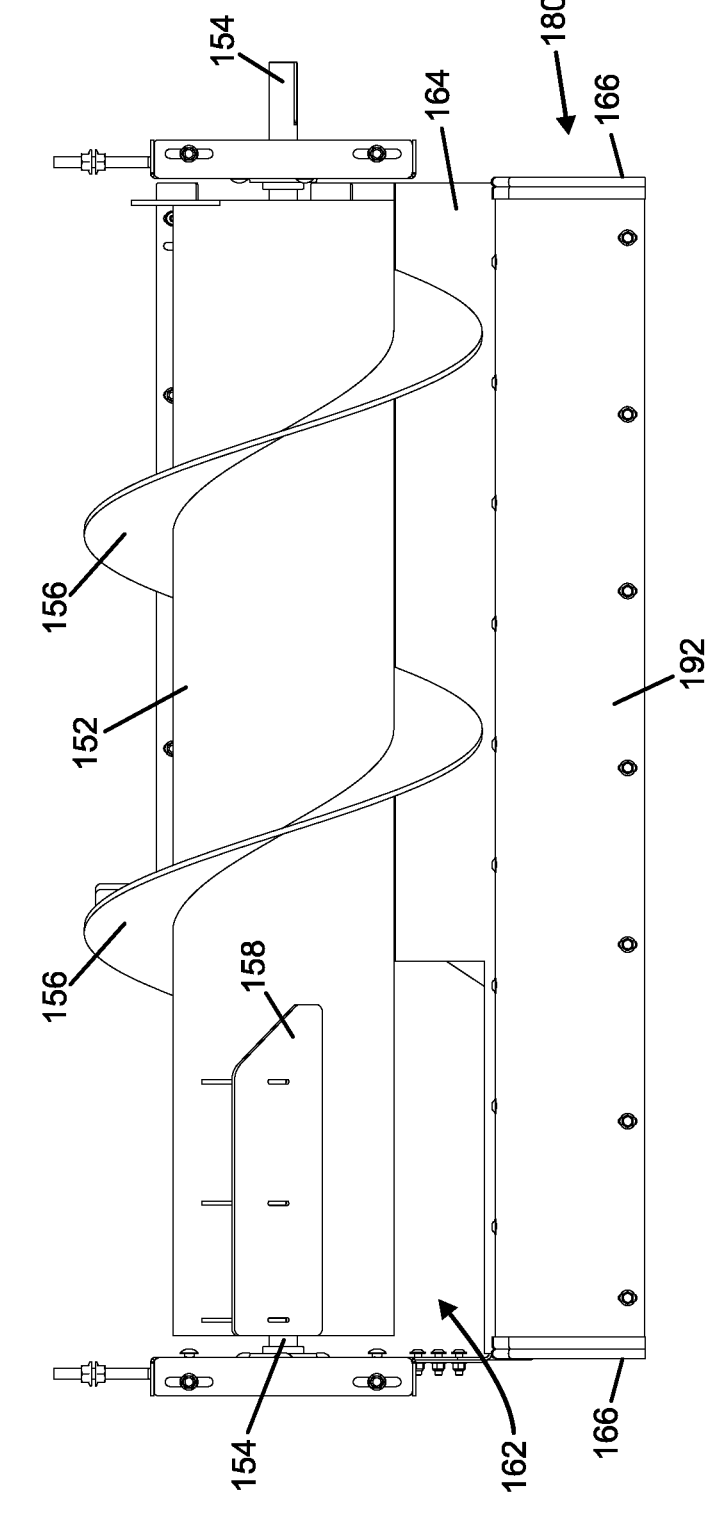
FIG. 13 is a front view of the auger.

Referring to FIGS. 12-16, an air direction system (180) is associated with each auger (150). The air direction assembly (180) includes a front (first) air nozzle (182) and a cover (192). The air direction assembly (180) directs air flow from the duct (178) to the bottom of the auger pan (164) and toward the auger discharge (162). Air flow at the upper front portion of the duct (178) is directed by the front nozzle (182) below the cover (192). The front nozzle (182) includes a longitudinally extending support portion (184). Vanes (186) extending rearward and/or upward at different angles are longitudinally spaced apart along the support portion (184). The vanes (186) each include lateral edges (188) so that openings (190) are formed between the vanes (186) for air to flow through toward the upper surface of the auger pan (164) and substantially inward. As shown in FIG. 12, the air direction assembly (180) is positioned below and slightly forward of the rear end of the feed belt (116) to provide air flow to the upper surface of the auger pan (164).

Figure 15:
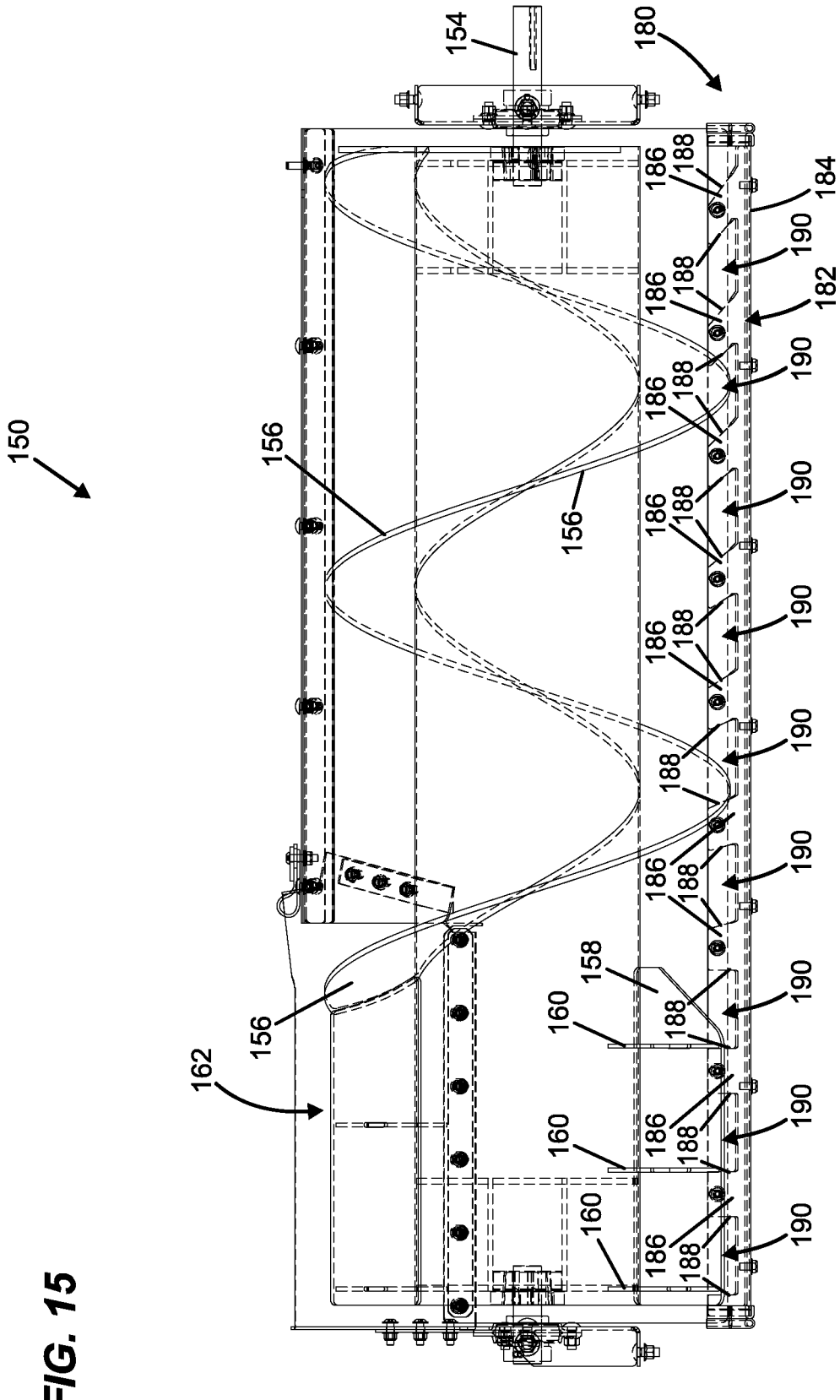
FIG. 15 is a top plan view of the auger and front nozzle shown in FIG. 13.

The orientation of each vane (186) varies and the angle of the lateral edges (188) of the vanes (186) also varies along the front nozzle (182). As shown in FIG. 15, the lateral edges (188) generally slant inward toward the auger discharge (162). In the embodiment shown, the outermost lateral edges (188) are more steeply angled inward toward the discharge (162). The angles of the edges (188) gradually becomes less acute until edges (188) aligned with the auger discharge (162) form substantially right angles to direct air flow substantially rearward. Moreover, the orientation of the vanes (186) also changes from the outer end of the auger (150) to the inner end.

Figure 14:
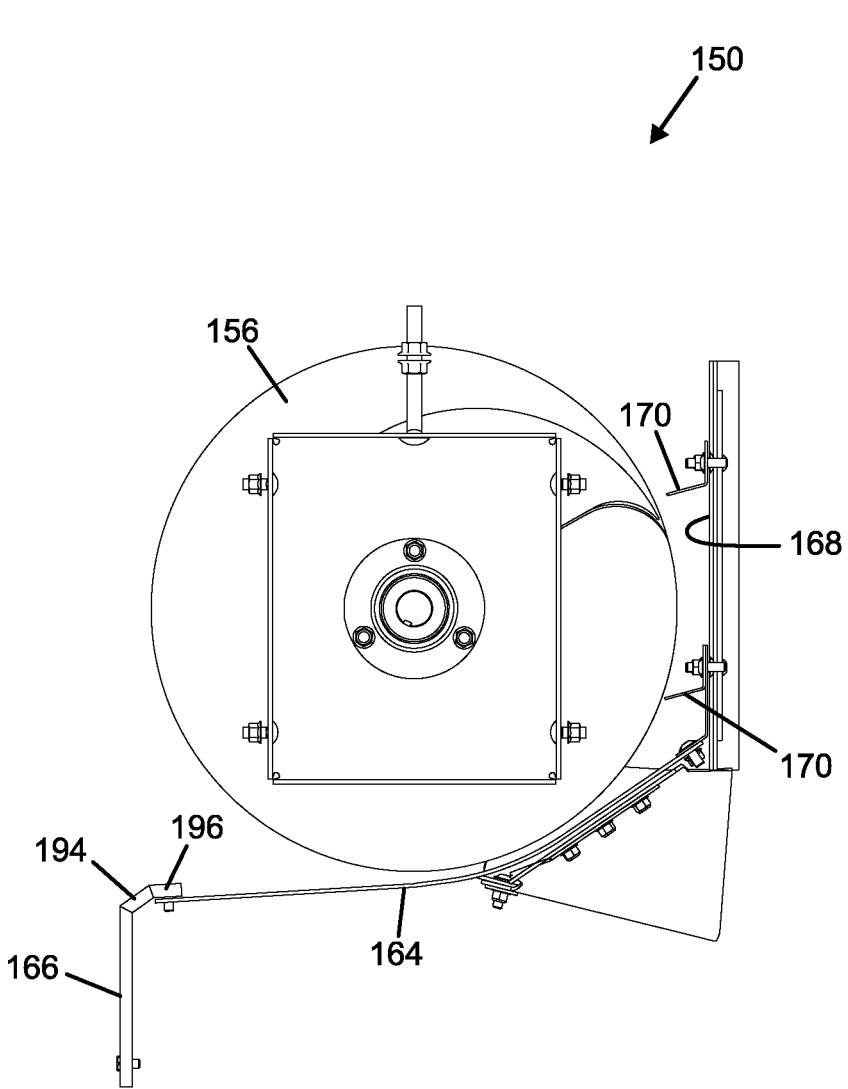
FIG. 14 is a left side view of the auger shown in FIG. 13.
Figure 16:
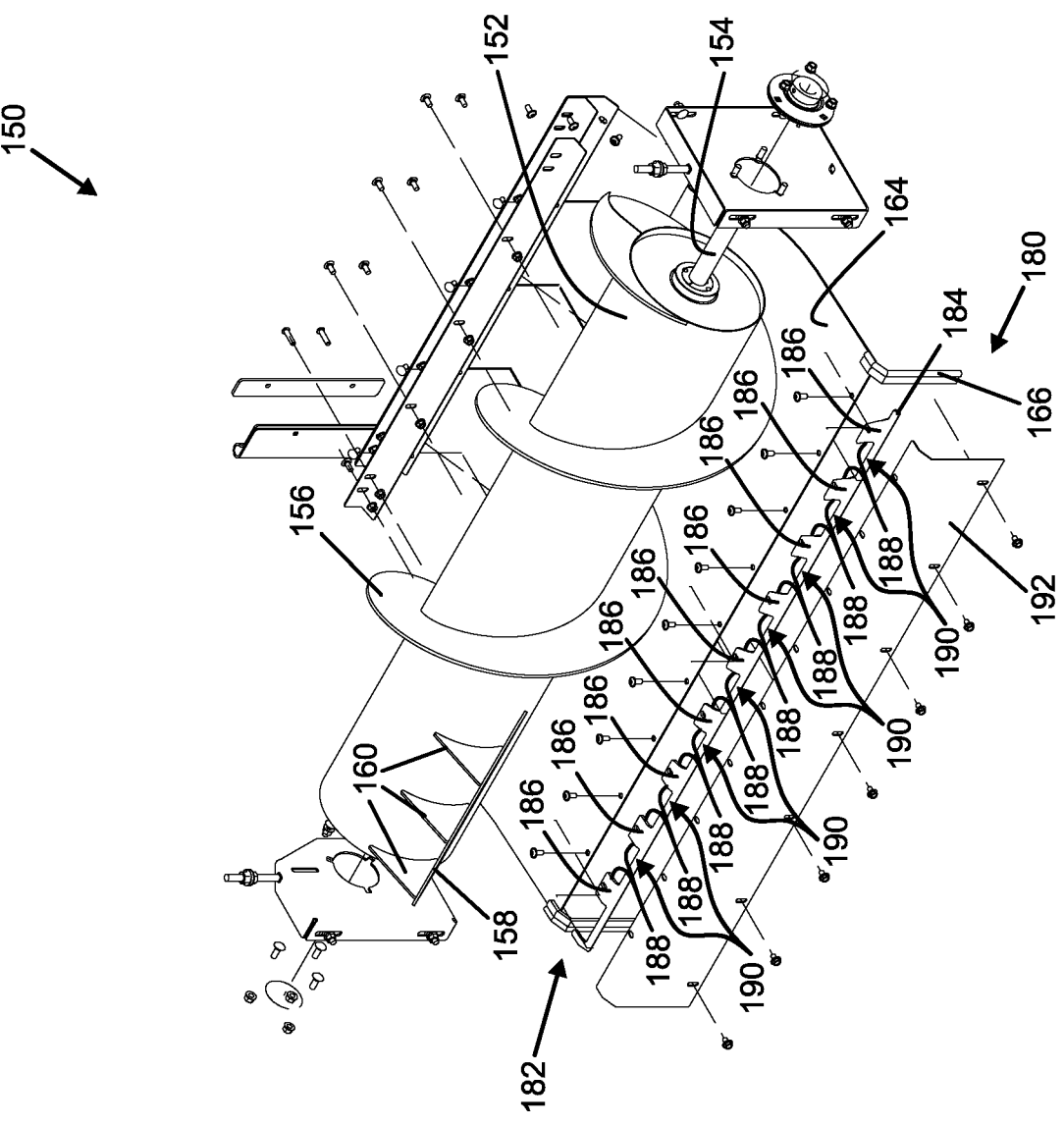
FIG. 16 is a partially exploded perspective view of the auger and front nozzle assembly.

As shown most clearly in FIG. 16, the vanes (186) near the outermost end of the front nozzle (182) extend substantially laterally while the vanes (186) near the inner end of the front nozzle (182) extend substantially horizontally and rearward. The orientation of the vanes (186) becomes progressively more horizontal and rearward extending rather than laterally extending starting from the outside end of the nozzle (182) to the inside end proximate the auger discharge (162). The cover (192) includes an upward and rearward extending section (194) over the vanes (186) and openings (190) and a rear horizontal portion (196), as shown in FIGS. 12 and 14. The vanes (186) and cover (192) form airflow paths through the openings (188) that aids in clearing material from the trough formed by the auger pan (162). With the air direction system (180), virtually all material delivered to the auger (150) is cleared and delivered into the discharge (162) after each crop test plot is cut. This continuous clearing of the auger pan (162) ensures greater accuracy for measuring yields of crop test plots and prevents contamination from material left in the pan (164) from previous plots.

Figures 17, 18:
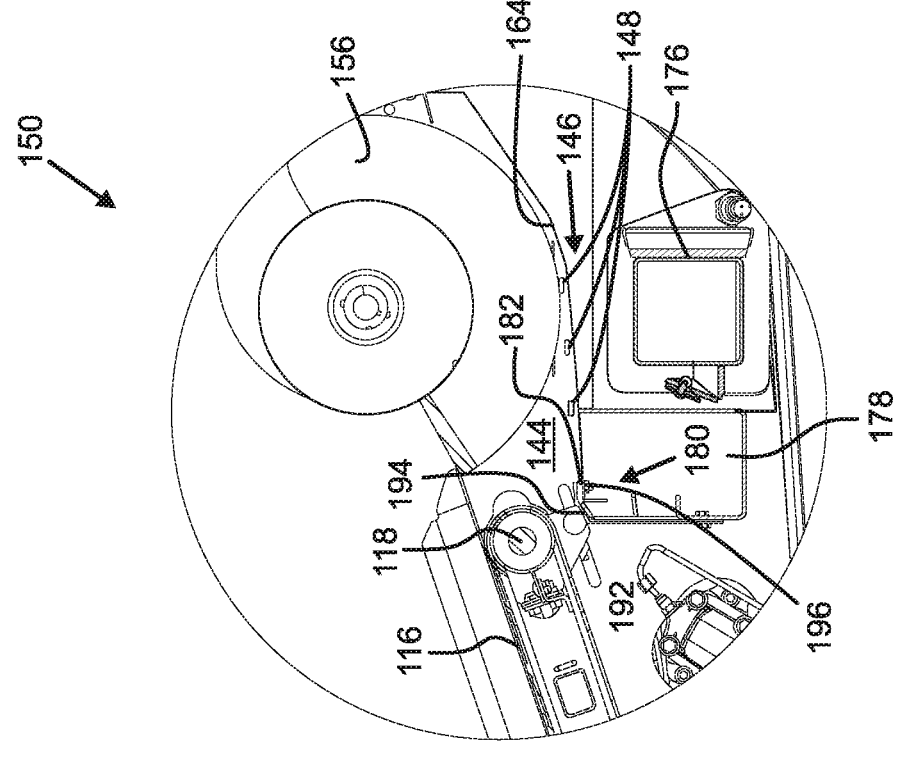
FIG. 17 is a side detail sectional view of the auger, belt, air duct, front nozzle and side nozzles.
FIG. 18 is a perspective detail view of the belt, auger, auger pan and side nozzles.

As shown in FIGS. 17 and 18, in one embodiment an end (second) nozzle (146) is formed in an end wall (144) of the auger assembly (150) in addition to the front nozzle. The end nozzle (146) includes slot-type apertures (148) spaced above the auger pan (164) and generally following the curvature of the auger pan at the end of the auger pan (164). The apertures (148) are positioned to direct airflow along the pan (164) rather than the top of the material in the pan for better cleaning and are spaced and arranged so there are no dead zones. The end nozzle (146) directs an air stream laterally inward to blow material on the auger pan (164) in the trough toward the center of the head. Air may be supplied from the fan (172). Airflow from the front nozzle (182) and the end nozzle (146) interact with one another to create a generally rearward and laterally inward flow trajectory. The auger helical blade (156), front nozzle (182) and end nozzle (146) combine to clear material from the auger (150) and maintain purity as the harvested crop from each test plot is individually processed and not mixed with crop from other crop test plots.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A harvester head, comprising:
   a gathering assembly;
   an outlet;
   a conveying system conveying harvested crop from the gathering assembly to the outlet, the conveying system comprising:
   an auger having a rotational axis extending along a longitudinal direction and including a center shaft and a helical blade;
   a pan extending parallel to the rotational axis of the auger, the pan comprising:
   a first edge at a first side of the rotational axis,
   a first portion extending from the first edge to beneath the auger,
   a trough portion extending from the first portion to a second side of the rotational axis, the trough portion defining a lower section with a generally upward extending surface at the second side of the rotational axis, and
   an auger discharge on the second side of the longitudinal axis;
   a first nozzle extending along the first edge of the pan, the nozzle directing air flow to the trough portion at a bottom of the pan;
   wherein the first nozzle comprises vanes defining a plurality of openings spaced longitudinally along the pan, wherein each of the plurality of openings is substantially directed toward the auger discharge, and wherein the vanes slant progressively more from an orientation substantially perpendicular to the longitudinal direction at a center of the first nozzle to an inward angled orientation at an end of the first nozzle.

2. The harvester head according to claim 1, comprising a belt for receiving harvested crop from a reel and delivering the harvested crop to the auger, wherein a portion of the belt extends proximate a portion of the first nozzle and the first edge of the pan.

3. The harvester head according to claim 1, wherein the auger comprises a first portion with a helical blade and a second portion with longitudinally extending blades.

4. The harvester head according to claim 3, wherein the auger comprises a first portion with a helical blade and a second portion with longitudinally extending blades, wherein the second portion is aligned with the auger discharge.

5. The harvester head according to claim 4, wherein the openings aligned radially outward from the straight blades have straight lateral edges and wherein openings aligned radially outward from the helical blade have edges slanting toward the auger discharge.

6. The harvester head according to claim 1, further comprising a second nozzle at a lateral end of the trough and comprising a plurality of spaced apart apertures, the apertures being spaced apart from the pan and substantially following a curvature of the pan.

7. The harvester head according to claim 1, further comprising a second nozzle at a lateral end of the trough portion of the pan and comprising a plurality of spaced apart apertures directing air along a bottom of the trough portion of the pan parallel to the longitudinal direction toward the auger discharge.

8. The harvester head according to claim 1, wherein the auger discharge is positioned substantially at a center of the pan.

9. A harvester head, comprising:
   a gathering assembly:
   an outlet;
   a conveying system conveying harvested crop from the gathering assembly to the outlet, the conveying system comprising:
   an auger having a rotational axis extending along a longitudinal direction and including a center shaft and a helical blade;
   a pan extending parallel to the rotational axis of the auger, the pan comprising:
      a first edge at a first side of the rotational axis,
      a first portion extending from the first edge to beneath the auger,
      a trough portion extending from the first portion to a second side of the rotational axis, the trough portion defining a lower section with a generally upward extending surface at the second side of the rotational axis, and
      an auger discharge on the second side of the longitudinal axis;
   a first nozzle extending along the first edge of the pan, the nozzle directing air flow to the trough portion at a bottom of the pan, wherein the first nozzle comprises vanes defining a plurality of openings spaced longitudinally along the pan, wherein each of the plurality of openings is substantially directed toward the auger discharge;
   a second nozzle at a lateral end of the trough portion of the pan and comprising a plurality of spaced apart apertures directing air along a bottom of the trough portion of the pan parallel to the longitudinal direction toward the auger discharge.

10. The harvester head according to claim 9, wherein the vanes slant progressively more from an orientation substantially perpendicular to the longitudinal direction at a center of the first nozzle to an inward angled orientation at an end of the first nozzle.

11. The harvester head according to claim 9, wherein the auger discharge is positioned substantially at a center of the pan.

12. A harvester configured to move along a direction of travel, comprising:
   a chassis;
   a head comprising:
      an outlet;
   a conveying system conveying harvested crop from the gathering assembly to the outlet, the conveying system comprising:
   an auger having a rotational axis extending along a longitudinal direction substantially transverse to the direction of travel, the auger including a center shaft and a helical blade;
   a pan extending in the longitudinal direction, the pan comprising:
      a first edge at a first side of the rotational axis,
      a first portion extending from the first edge to beneath the auger,
      a trough portion extending from the first portion to a second side of the rotational axis, the trough portion defining a lower section with a generally upward extending surface at the second side of the rotational axis, and
      an auger discharge on the second side of the longitudinal axis;
   a first nozzle extending along the first edge of the pan, the nozzle directing air flow to the trough portion at a bottom of the pan, wherein the first nozzle comprises vanes defining a plurality of openings spaced longitudinally along the first edge, wherein each of the plurality of openings is substantially directed toward the auger discharge.

13. The harvester according to claim 12, comprising a belt for receiving harvested crop from a reel and delivering the harvested crop to the auger, wherein a portion of the belt extends proximate a portion of the first nozzle and the first edge of the pan.

14. The harvester according to claim 12, further comprising a second nozzle at a lateral end of the trough portion of the pan and comprising a plurality of spaced apart apertures directing air along a bottom of the trough portion of the pan parallel to the longitudinal direction toward the auger discharge.

15. The harvester head according to claim 12, wherein the auger discharge is positioned substantially at a center of the pan.

16. A harvester configured to move along a direction of travel, comprising:
   a chassis;
   a head comprising:
      an outlet;
   a conveying system conveying harvested crop from the gathering assembly to the outlet, the conveying system comprising:
   an auger having a rotational axis extending along a longitudinal direction substantially transverse to the direction of travel, the auger including a center shaft and a helical blade;
   a pan extending in the longitudinal direction, the pan comprising:
      a first edge at a first side of the rotational axis,
      a first portion extending from the first edge to beneath the auger,
      a trough portion extending from the first portion to a second side of the rotational axis, the trough portion defining a lower section with a generally upward extending surface at the second side of the rotational axis, an auger discharge on the second side of the longitudinal axis;

a first nozzle extending along the first edge of the pan, the nozzle directing air flow to the trough portion at a bottom of the pan, wherein the first nozzle comprises vanes defining a plurality of openings spaced longitudinally along the pan, wherein each of the plurality of openings is substantially directed toward the auger discharge; and a second nozzle at a lateral end of the trough portion of the pan and comprising a plurality of spaced apart apertures directing air along a bottom of the trough portion of the pan parallel to the longitudinal direction toward the auger discharge.

17. The harvester according to claim 16, wherein the auger discharge is positioned substantially at a center of the pan.

18. The harvester according to claim 16, wherein the vanes slant progressively more from an orientation substantially perpendicular to the longitudinal direction at a center of the first nozzle to an inward angled orientation at an end of the first nozzle.

\*  \*  \*  \*  \*